United States Patent [19]

Horejsi et al.

[11] Patent Number: 5,239,487

[45] Date of Patent: Aug. 24, 1993

[54] COMPUTER INTEGRATED MANUFACTURING REWORK APPARATUS AND METHOD

[75] Inventors: Steven A. Horejsi; Jack R. Landon; Gregg C. Marquardt; John C. Stokes, all of Rochester, Minn.

[73] Assignee: International Business Machines Corporation, Armonk, N.Y.

[21] Appl. No.: 602,529

[22] Filed: Oct. 24, 1990

[51] Int. Cl.$^5$ .............................................. G06F 15/46
[52] U.S. Cl. ..................................... 364/552; 395/916
[58] Field of Search ................. 364/552, 551.02, 580, 364/579; 371/24, 25.1, 26; 395/155, 156, 161, 916, 121

[56] References Cited

U.S. PATENT DOCUMENTS

| | | | |
|---|---|---|---|
| 4,396,977 | 8/1983 | Slater et al. | 364/188 |
| 4,709,337 | 11/1987 | Knapp et al. | 364/468 |
| 4,837,502 | 6/1989 | Ugenti | 324/73 PC |
| 4,847,795 | 7/1989 | Baker et al. | 364/579 |
| 5,001,714 | 3/1991 | Stark et al. | 371/26 |
| 5,043,910 | 8/1991 | Chiba | 364/551.01 |
| 5,075,876 | 12/1991 | Seki et al. | 395/121 |
| 5,086,397 | 2/1992 | Schuster et al. | 364/551.01 |
| 5,088,054 | 2/1992 | Paris, II | 395/121 |

*Primary Examiner*—Thomas G. Black
*Assistant Examiner*—Michael Zanelli
*Attorney, Agent, or Firm*—Roy W. Truelson

[57] ABSTRACT

A manufacturing rework station is integrated with a computer. A repair cell program running on the computer functions as an interface between the rework station operator, one or more databases, and one or more knowledge bases. The repair cell provides the operator with an easy to use graphical environment which aids in the diagnosis and repair of defects. The cell simultaneously provides operator assistance, records operator activity, and collects new knowledge when the problem under analysis was previously unknown. The databases contain manufacturing history for each individual article. The operator will input the serial number of the article with a bar-code reader, causing the program to fetch the record of the article. The computer generates an image of the article on the display. The operator may select a component of the article with a lightpen. In response to the selection of a component, the computer displays the possible diagnoses and repair actions associated with that component, together with a figure of merit. The operator may also invoke an expert consultation mode, in which the computer suggests a diagnosis or requests additional information while searching a directed graph. When a diagnosis is made, the computer automatically updates its databases. A plant monitoring and reporting program has access to the diagnostic statistics, and can generate a warning when a particular defect exceeds a limit, or generate defect reports on request.

31 Claims, 9 Drawing Sheets

CARD COMPONENT DATABASE

REPAIR ACTION / DEFECT DATABASES

701 → 6125B379, P7883495, . . . UICSIP4, 425, 1, 24, 2392124, D900F400, F, 9010020915
     710       711           712     713 714 715   716    717     718     719

COMPUTER INTEGRATED MANUFACTURING REWORK APPARATUS AND METHOD

FIELD OF THE INVENTION

The present invention relates to computer integrated manufacturing, and in particular to a computer system which supports the rework of manufactured articles.

DESCRIPTION OF THE PRIOR ART

Today, we are surrounded by many useful articles of human manufacture. Historically, manufactured articles have grown increasingly complex, and there is every reason to believe they will continue to do so in the future. In order to cope with the increasing complexity of manufactured articles, the processes by which these articles are made must continually be made more efficient.

In recent decades there has been a spectacular growth in machines that use and process information. This phenomenon has sometimes been referred to as the "second industrial revolution". Just as the steam engine was the symbol and driving force of the first industrial revolution, the digital electronic computer has become the symbol and driving force of the second.

With this spectacular growth in the field of information processing, it was inevitable that computers would be enlisted in the struggle to make manufacturing processes more efficient. The use of computers to improve manufacturing processes has become a field in itself, known as computer integrated manufacturing (CIM). There are today hundreds of uses for computers in manufacturing, and the number of new uses is growing. However, CIM is still in its infancy. There are many manufacturing processes to which it has yet to be applied.

Many manufacturing processes involving complex articles must make provision for rework. Rework is the process of correcting the defects in a manufactured article, after it has completed the normal stages of a manufacturing process. It is not uncommon, for example, for an article to contain hundreds of component parts. When the article is assembled, it will be subjected to inspection and functional testing, to verify that the article is correctly manufactured. Depending on the complexity, inspection and functional testing may be performed at various stages of manufacture and on different levels of assemblies. A certain percentage of articles will fail this testing. In the event of failure, the article will either be scrapped or reworked. Scrapping a defective article is feasible in the case of simple, inexpensive wares, but it doesn't make economic sense in the case of more complex, expensive assemblies. For example, an automobile after final assembly and inspection may prove to have a defective windshield wiper. In this case, it does not make sense to scrap the automobile. The manufacturer will instead correct the problem by rework, i.e. repair or replacement of the defective component.

Rework tends to be a very specialized process. One common thread among existing CIM applications is that they apply to the mainline manufacturing process, rather than the rework process. This is so because mainline processes are predictable. The computer knows what stage of the process comes next, what component parts must be added to the assembly during this stage, which manufacturing stations have the capability to perform the work, how long the work should take, etc. Rework, on the other hand, is inherently unpredictable. There is no way to know in advance how long it will take to diagnose a problem, or what components will require repair or replacement. Because diagnosis of certain problems is not an exact science, the initial diagnosis is frequently wrong, and the reworked article will fail testing even after some of the components are replaced. The article may go through several passes of diagnosis and repair in rework stations before the problem is corrected. For these reasons, rework is generally a manual process. Even in a computer automated factory environment, an article requiring rework is usually removed from the normal manufacturing stream, and set aside in a manual rework station. Here, a person with sufficient expertise will diagnose the problem, and either correct it himself or send the article to some other work station for repair. When the problem has been corrected, the article must be re-tested, and eventually re-inserted into the manufacturing stream.

There are additional consequences of this imbalance between an automated mainline process and manual rework. No matter how good the process control, defects can be introduced from time to time into the mainline process. For example, a batch of component parts from a supplier may have a high rate of defects, a robotic arm may be misaligned, a temperature control unit may malfunction, etc. If the resultant defects in the manufactured products are not discovered until they are diagnosed during manual rework, it could be days or weeks before someone realizes that the same defect is repeatedly appearing, and tracks that defect down to the offending cause. The automated line could in the meantime produce large numbers of defective articles.

Prior art computer integrated manufacturing applications have focused on the mainline manufacturing process. For example, computers have been used in manufacturing to track inventories, to direct the flow of the manufactured articles among different manufacturing work stations, to control robotic equipment, to schedule critical equipment and processes, and for many other things. These systems have considerably increased the productivity and efficiency of the mainline process. However, these systems generally do not address the problems of rework.

In a manufacturing facility with a low level of automation, rework consumes a relatively small proportion of the facility's total human resources. However, as mainline manufacturing processes become increasingly automated, and integrated with computer control, the proportion of human resources devoted to the manual rework process grows ever larger. What is worse, the diagnostic and specialized nature of rework demands the more skilled members of the work force. With the rising complexity of manufactured articles, we can expect that the possible causes of failure and the difficulty of diagnosing them will increase. All of these factors foretell a day when "automated" factories will become bogged down in their own rework. Of course, such a scenario need not occur, if the mind of man can devise more efficient mechanisms for performing rework. Such is the thrust of the invention disclosed herein.

It is therefore an object of the present invention to provide an enhanced method and apparatus for performing rework of manufactured articles.

Another object of this invention is to provide more accurate diagnosis of faults in a manufacturing rework process.

Another object of this invention is to reduce the time required to rework manufactured articles.

Another object of this invention is to reduce the cost associated with reworking manufactured articles.

Another object of this invention is to reduce the level of expertise required of persons performing rework of manufactured articles.

Another object of this invention is to provide an enhanced method and apparatus whereby shortcomings in a mainline manufacturing process may be identified.

Another object of this invention is to provide an earlier warning of shortcomings in a mainline manufacturing process.

Another object of this invention is to provide an enhanced method and apparatus for gathering statistics concerning the causes of failures in manufactured articles.

Another object of this invention is to reduce the cost of gathering statistics concerning the causes of failures in manufactured articles.

Another object of this invention is to increase the speed with which statistics concerning the causes of failures in manufactured articles may be obtained.

SUMMARY OF THE INVENTION

A manufacturing rework station is integrated with a computer according to this invention. The rework station comprises a computer having access to one or more databases, a computer display connected to the computer, and input/output means for the rework station operator. A repair cell application program running on the computer functions as an interface mechanism between the rework station operator, one or more databases, and (optionally) one or more knowledge bases (expert systems). Its purpose is to provide the operator with an easy to use graphical environment which aids in the diagnosis and repair of defects in the manufactured article. This ability is provided through the object orientation of the interface. In the preferred embodiment, this mechanism simultaneously provides operator assistance, records operator activity, and collects new knowledge when the problem under analysis was previously unknown, although some of these aspects of the invention may be implemented independently. The activity monitoring and data acquisition is passive, requiring no specific actions on the operator's part. The intent is to create a user interface which aids a knowledge base in maintaining itself, and which may be consulted by the operator when he is unsure how to proceed.

In the preferred embodiment, one or more of the databases contain manufacturing history for each individual article. These databases will contain a complete list of all repair actions performed on the article, as well as the failure symptoms that were exhibited by the article during testing. Upon arrival of the article at a rework station, the operator will input the serial number of the article with a bar-code reader, identifying the type of article to the repair cell program and causing the program to fetch the historical record of the article. The computer will generate a graphical representation of the article on the display screen. The operator may select a component of the article with a cursor pointing device, such as a mouse or lightpen. Each component is associated with a list of possible diagnoses affecting that component. In response to the selection of a component, the computer displays the possible diagnoses and repair actions associated with that component. The operator may also invoke either of two consultation modes. In one mode, the computer displays a figure of merit for each diagnosis, representing the relative frequency that the indicated repair action has cured similar defect symptoms in the past. In the second consultation mode, an expert system follows a directed graph of decision points to arrive at a diagnosis. The diagnosis is based on defect symptoms exhibited during testing of the article, the past frequency of repair actions, the history of repair actions taken with respect to the particular article, and rules of guidance derived from engineering personnel. When the operator has determined a diagnosis, he selects one of the listed items and performs the repair action. In the alternative, the actual repair could be performed at a different work station, after the diagnosis has been made. When a diagnosis and repair action is selected, the computer automatically updates its databases containing the repair history of the individual article as well as the diagnostic statistics for the manufacturing line.

In the preferred embodiment, a plant monitoring and reporting program has access to the diagnostic statistics. When a particular diagnosis shows increased frequency, the program will generate a warning message to the plant operators. The databases not only contain repair history data, but the identity of all manufacturing stations performing work on that part. With this data, the monitoring and reporting program can determine which station is responsible for a rise in defects. The monitoring and reporting program can also issue general reports of plant performance in response to a request from the operator.

DETAILED DESCRIPTION OF THE PREFERRED EMBODIMENT

Figure 1:
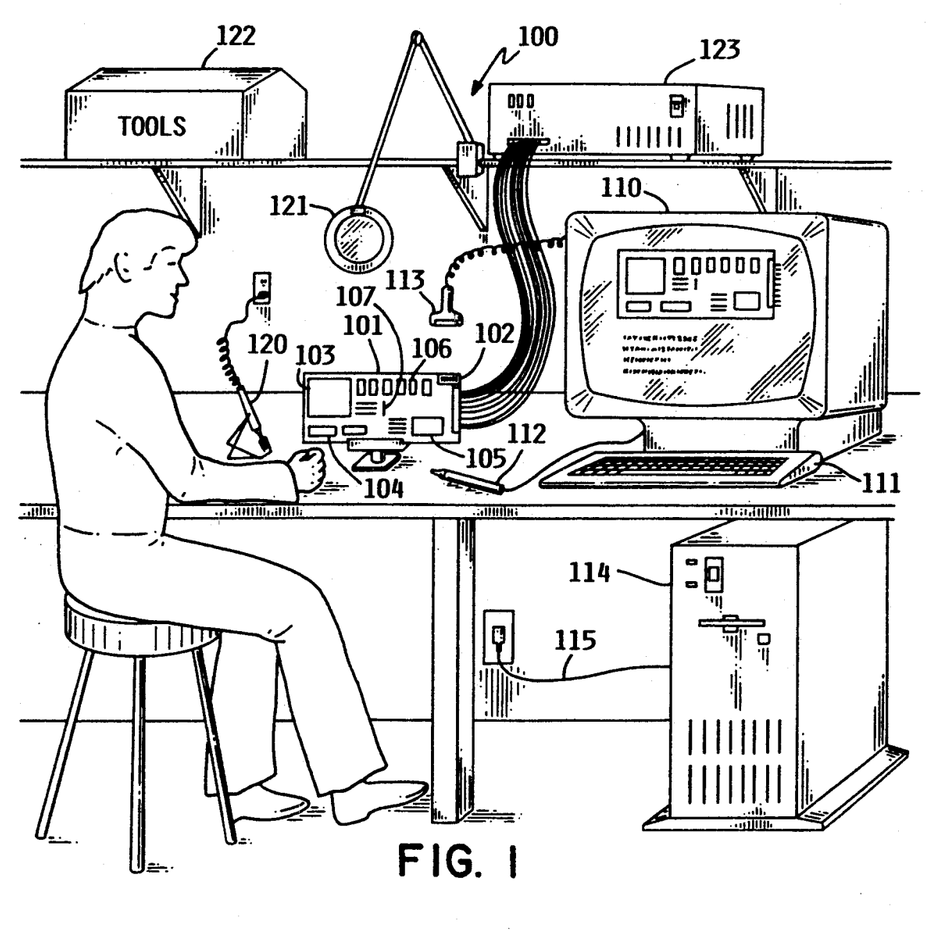
FIG. 1 shows the major components of a computer integrated rework station according to the preferred embodiment of this invention.

FIG. 1 shows a typical rework station 100 according to the preferred embodiment of the present invention. In the embodiment described herein, the manufactured article is an electronic circuit card assembly 101. However, it should be understood that this invention is applicable to the rework of almost any article of manufacture, and is not limited to electronic circuit card assemblies.

A computer generated display means, which in this embodiment is a cathode ray tube display 110, provides graphical and textual information to the operator. Display 110 is coupled to local computer 114. Keyboard 111, light pen 112, and bar code reader 113 are also coupled to local computer 114. These devices provide input information to the computer, it being understood that other input means could be used in alternative embodiments. Local computer 114 is connected via communications cable 115 to a local area network. In the preferred embodiment, local computer 114 is an IBM Personal System/2 computer, which includes a local disk drive storage device, it being understood that other computers could be used.

Card assembly 101 comprises a plurality of electronic components 103, 104, 105, 106, 107, e.g. logic modules, memory modules, resistors, diodes, connectors, etc. Card assembly 101 also includes a bar coded label 102, capable of being read by bar code reader 113.

In the preferred embodiment, diagnosis and repair are performed at a single rework station, so that the rework station also comprises soldering tool 120, lighted magnifying glass 121, and other miscellaneous tools 122 required to perform repairs. In an alternative embodiment, diagnosis and repair could be performed at separate work stations. The rework station optionally includes test device 123, connected to the card under rework and to local computer 114. Test device 123 is capable of running diagnostic logic tests on card 101 in response to commands received from local computer 114.

Figure 2:
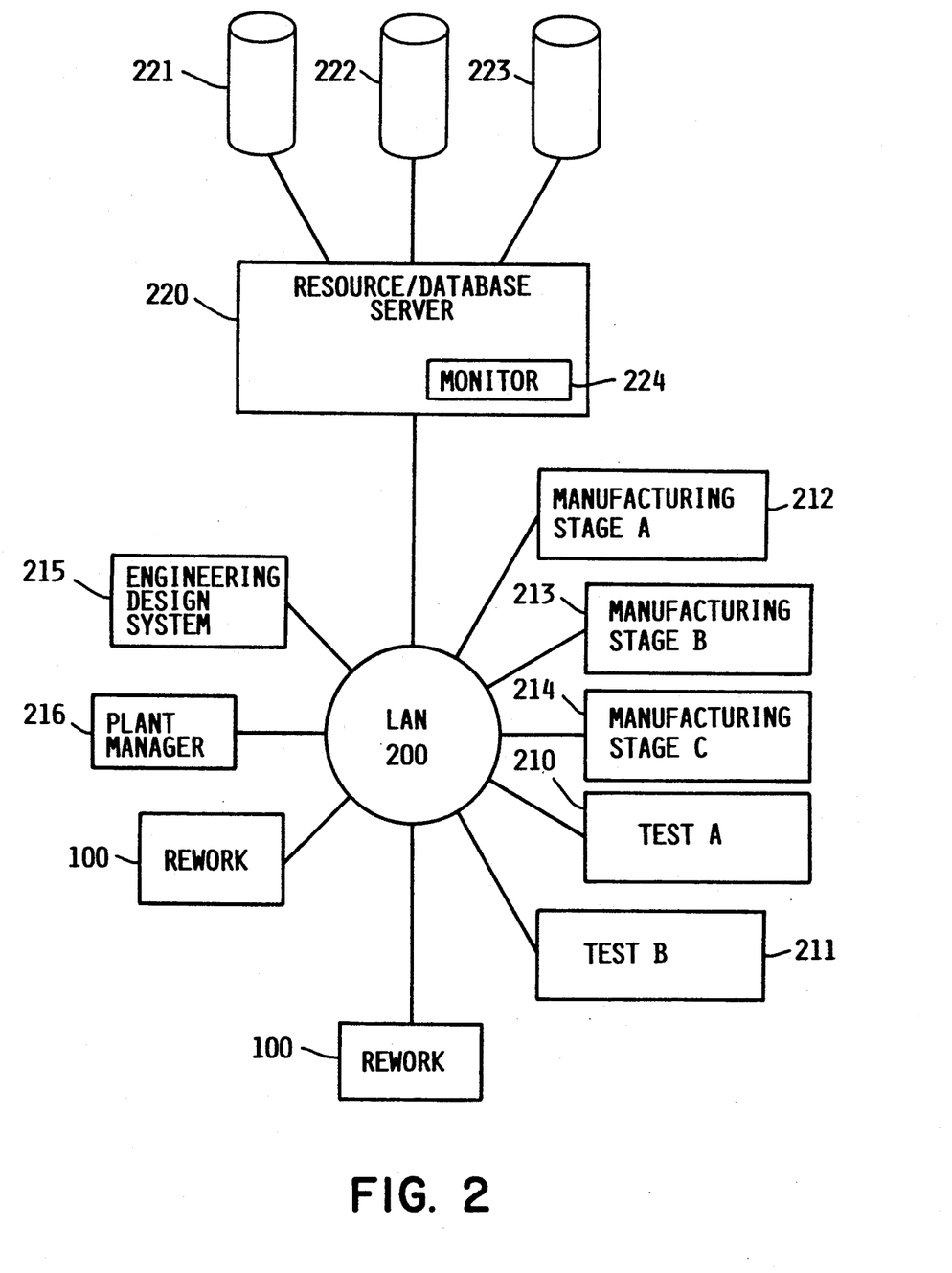
FIG. 2 shows the local area network environment of a computer integrated rework station according to the preferred embodiment of this invention.

Local area network (LAN) 200 is shown in FIG. 2. The local computer 114 of one or more rework stations 100 are connected to LAN 200. Additionally, computer terminals at one or more test stations 210, 211 and at one or more assembly stations on the manufacturing line 212, 213, 214 are connected to the LAN. Engineering design system 215, plant manager station 216 and resource/database server 220 are also connected to LAN 200. Engineering design system 215 is a computer system used by engineering personnel to design the cards being manufactured. Plant manager 216 is a station used by plant management personnel for monitoring overall performance of the manufacturing facility. Resource/database server 220 controls access to one or more data storage devices 221, 222, 223, which in the preferred embodiment are rotating magnetic disk drives. The data storage devices are used to store databases required by local computer 114 of the rework station, as well as other areas of the system. Server 220 will sometimes act as a resource server, accessing database information and manipulating it prior to sending it out over LAN 200; at other times, server 220 is strictly a database server, returning unprocessed database information in response to a request. Server 220 also contains defect monitor 224. Monitor 224 is an application program which monitors repair actions and generates warning messages when defects rise above a critical level. While FIG. 2 shows two rework stations, two test stations, and three manufacturing stations, a single engineering design system, plant manager, and resource/database server, it should be understood that the actual number of nodes that may be connected to LAN 200 is variable, and that nodes of other type may be connected to the LAN.

Figure 3:
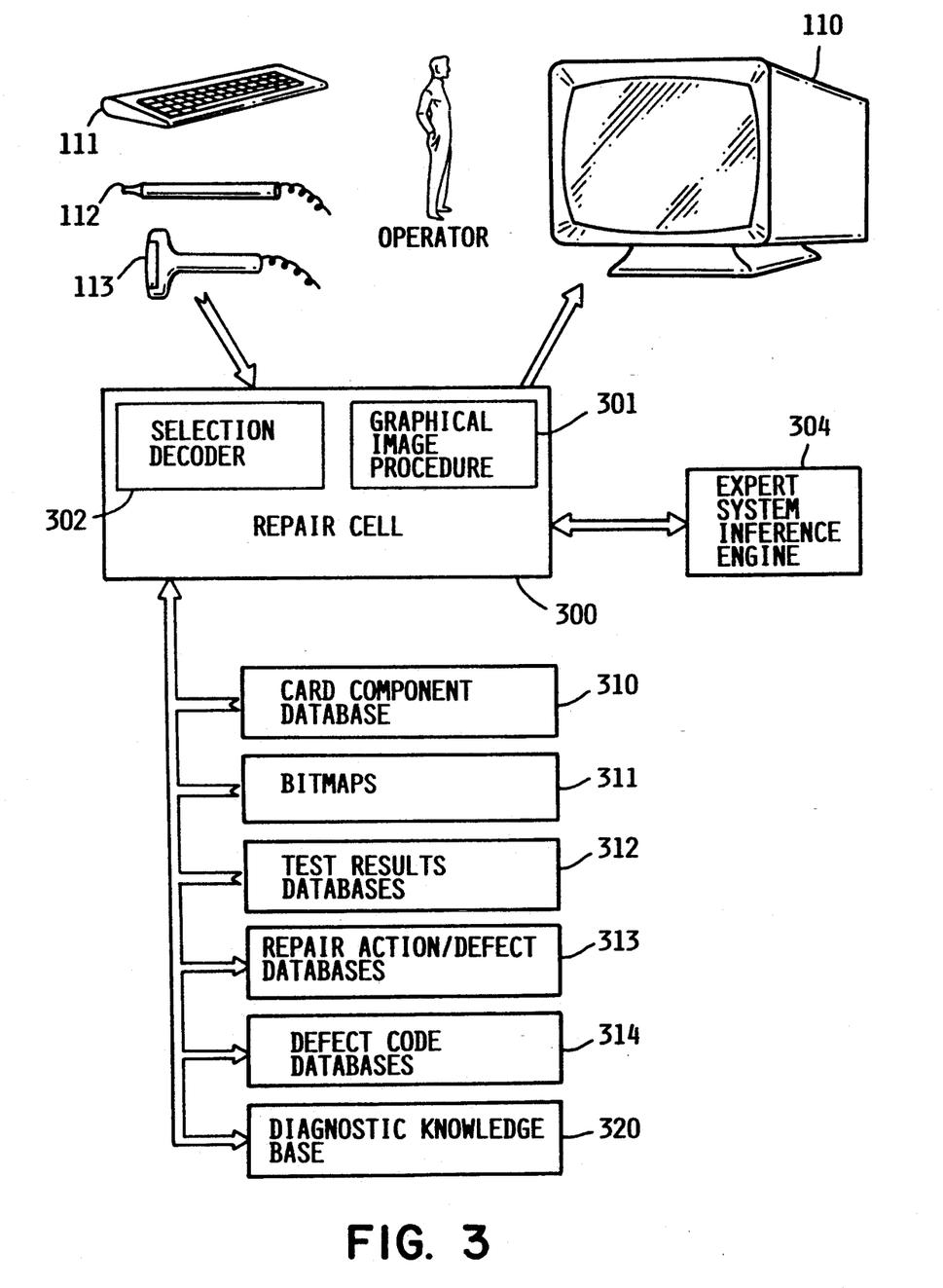
FIG. 3 shows the operating environment of the repair cell application program according to the preferred embodiment.

A repair cell application program 300 resides and executes on local computer 114. As shown in FIG. 3, repair cell 300 is an electronic interface mechanism between the rework station operator, one or more databases 310-314, and one or more knowledge bases (expert systems) 320. Its purpose is to provide the operator with an easy to use graphical environment which aids in the diagnosis and repair of defects in the card assembly. Repair cell 300 may invoke expert system inferencing engine 304 for assistance in diagnosing card assembly defects. In this embodiment, repair cell 300 has access to card component database 310, set of bitmap images 311, test result databases 312, repair action/defect databases 313, and defect code databases 314. It also can access diagnostic knowledge base 320. Card component database 310 contains bill of material information describing the card assembly and its component parts. Bitmap images 311 contain graphical images of components included in the card assembly, which are pieced together to form a composite image of the assembly. Test results databases 312 contain the complete test results and failure symptoms for each individual card. Repair action/defect databases 313 contain the history of all repair actions, and the history of repair actions later judged successful (hence indicative of correct diagnosis). Defect code databases 314 contain data relating each sub-object type to the possible diagnoses and repair actions applicable to that type. Diagnostic knowledge base 320 is a knowledge base of production rules, established in consultation with engineering personnel, to assist in diagnosing defect conditions. The rules in diagnostic knowledge base 320 form the knowledge base required by expert system inferencing engine 304 in making inferences concerning card defects. In this embodiment, repair cell 300 and expert system inferencing engine 304 reside on local computer 114. The master copy of databases 310-314 and knowledge base 320 reside on storage devices 221, 222, 223 accessible through database server 220; a local copy of all or portions of these databases may be kept on local computer 114 to improve performance.

Repair cell 300 includes a graphical image procedure 301 and a selection decode procedure 302. These two procedures form the centerpiece of the operator interface. Graphical image procedure 301 builds an image of the card assembly under diagnosis, and displays it on display 110. The image is constructed from objects and sub-objects stored in card component database 310. This image may be a single entity, or (most often) a mosaic or composite image of numerous sub-objects. These sub-objects may be of related or unrelated types. Selection decode procedure 302 permits the user to select one of the components of the card assembly by pointing to it with light pen 112. The procedure decodes the screen location and determines which sub-object is being displayed at that location.

Figure 4:
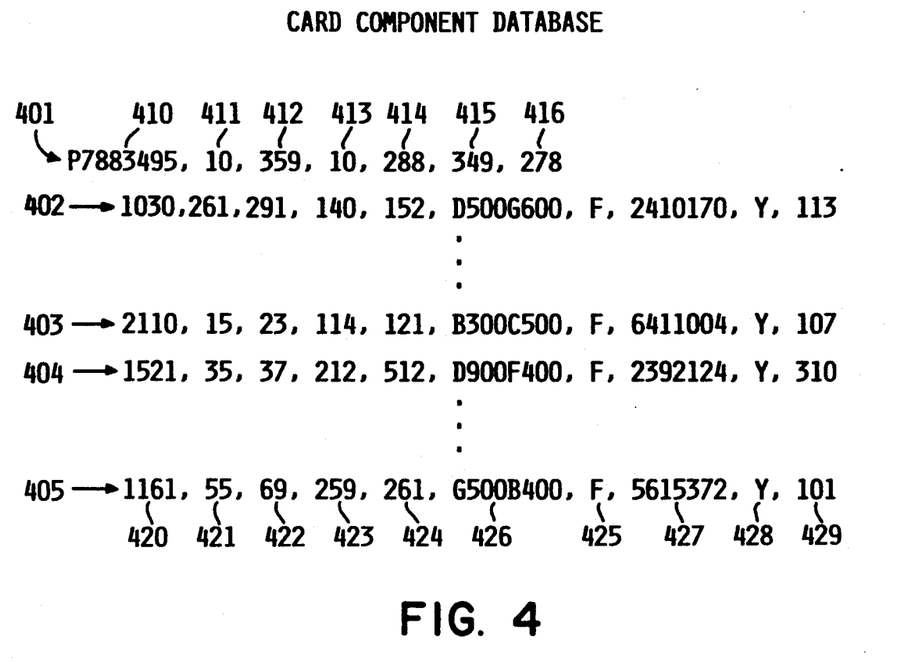
FIG. 4 shows the structure of a typical card descriptive file according to the preferred embodiment.

Card component database 310 contains a plurality of card descriptive files, each of which describes a type of card assembly. FIG. 4 shows the structure of a typical card descriptive file 400. File 400 is named according to the part number of the card assembly, each part number decoding to some unique file name. This permits accessing of the card component file for a part number once the part number is known.

Card component file 400 contains a single header entry 401 defining the global parameters of the card, and (optionally) one or more sub-object entries 402, 403, 404, 405 defining the type and location of components and features on the card. The fields of the sub-object entries 420-429 shown in FIG. 4 are defined below.

Graphical image procedure 301 constructs a graphical image by building a base card from the header, and adding features specified by the sub-object entries. Sub-object entries are not necessarily true components, but may be merely image features which are incorporated into the image of the card assembly, to assist in visual identification. In the preferred embodiment, the engineering design system used by engineering personnel to design the card assembly is coupled to local area network 200. The bill of material for each assembly are contained in the engineering design system. An application program resident in the engineering design system creates card component file 400 from the bill of materials. Thus the generation and maintenance of card images is fully automated.

Figure 5:
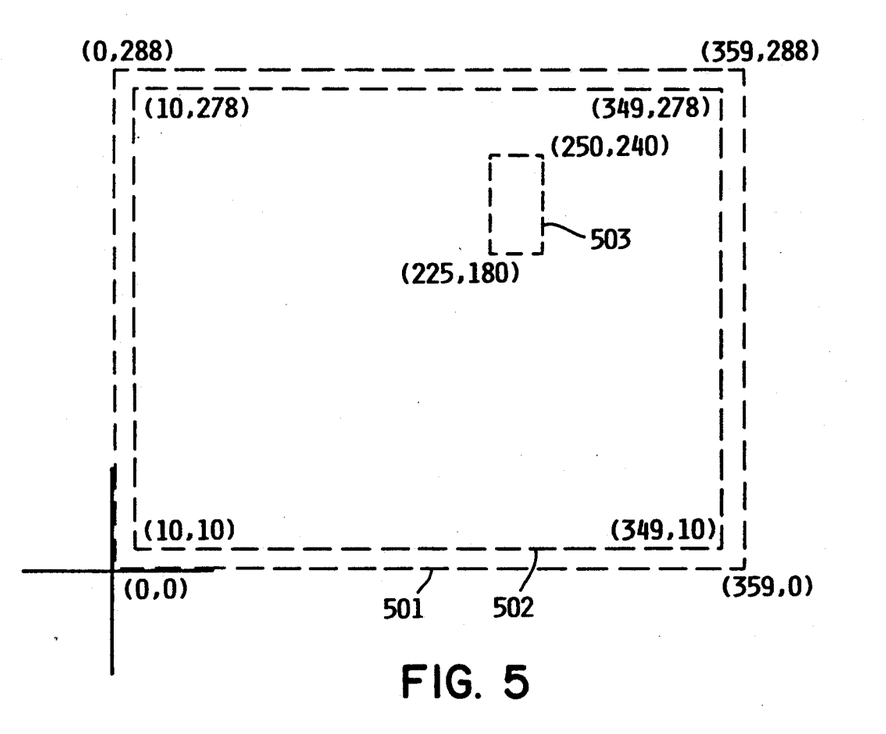
FIG. 5 shows the coordinate system used to define card and component images in the preferred embodiment.

Card header entry 401 defines the size and part number of the card, as shown in FIG. 4. It consists of part number field 410 and card extent fields 411–416. Card extent fields 411–416 define two nested rectangles as shown in FIG. 5. Image extent rectangle 501 is the outer rectangle; it defines the space available for the mapping of bitmap images onto the card. Raw card extent rectangle 502 is the inner rectangle, defining the size of the physical raw card. Image extent rectangle 501 is larger than raw card extent rectangle 502 because it is possible for some components (e.g. connectors) to extend over the edge of the card. Card extent fields 411–416 define these rectangles in an X-Y coordinate system, in which the lower left corner of image extent rectangle 501 is the origin. Extent fields 413 and 411 are the "X" and "Y" coordinates, respectively, of the lower left corner of raw card extent rectangle 502. Extent fields 416 and 415 are the "X" and "Y" coordinates, respectively, of the upper right corner of raw card extent rectangle 502. Extent fields 414 and 412 are the "X" and "Y" coordinates, respectively of the upper right corner of image extent rectangle 501.

Each sub-object entry 402–405 is associated with a color bitmap representation of the component or feature. For example, a logic module may be a rectangle with an orientation notch and pins protruding from the sides; the pins or notch may be of different color than the base rectangle to assist in visual identification. A series of application programs resident in the engineering design system manipulates the card bill of material first into a descriptive bitmap placement and extent list and secondly into a composite bitmap for the assembly. These finished bitmaps are compressed to minimize access time across local area network 200 and stored in bitmap database 313. The bitmaps are dynamically decompressed when received by local computer 114.

Sub-object image bitmap identifier field 420 is a numeric identifier of the bitmap that will be used to represent the sub-object when the composite image is created. This identifier is itself encoded, with the least significant digit representing the orientation at which to place this instance of the bitmap. The coding scheme is '0'=0 degrees, '1'=90 degrees, etc. which allows for the four cardinal orientations. This is sufficiently flexible for use in card assemblies.

Min/max sub-object extent fields 421, 422, 423, 424 define the minimum and maximum "X" and "Y" extent of the component or feature. The sub-object is described as occupying a rectangular extent area 503 in the two-dimensional plane of the card assembly. These extent fields define the limits of rectangular area 503 by specifying the "X" and "Y" coordinates of two opposite corners of the component, as shown in FIG. 5. More complex sub-objects would obviously require a more involved set of limit description numbers, possibly including a third dimension and/or complex polygons sub-object domain descriptions.

Front/back indicator 425 is a flag used in this two-dimensional implementation to differentiate sub-objects on the front side of the circuit card from those on the back. It is common in the design of circuit cards to place components on both sides of the card.

Sub-object location identifier 426 defines the sub-object location in the nomenclature of the Engineering Design System. It is included in the sub-object record to allow repair actions collected by the system to be reported in a compatible format. This information is redundant, since an algorithm could be derived to transform sub-object extent fields 421-424 into this format. Its existence is justified by performance considerations.

Sub-object part number 427 is the part number of the component. The repair cell can display this part number to the operator, allowing quick access to the spare parts inventory, which is keyed by part number.

Selectable sub-object flag 428 is used to differentiate true component sub-objects from other included bitmaps which are merely included detail or 'window dressing'. Selection decode procedure 302 checks this flag and will not allow selection of items which are not true components.

Sub-object type field 429 defines the diagnoses and repair actions associated with the component. This field is used to inform selection decode procedure 302 which object type is to receive messages if this sub-object is selected by the operator. The sub-object type is independent of the representative bitmap image used, allowing functionally similar sub-objects which are visually different to reuse the same object support code. This drastically reduces the need to create new objects, since most new sub-objects are merely new instances of pre-existing sub-object types.

Figure 6:
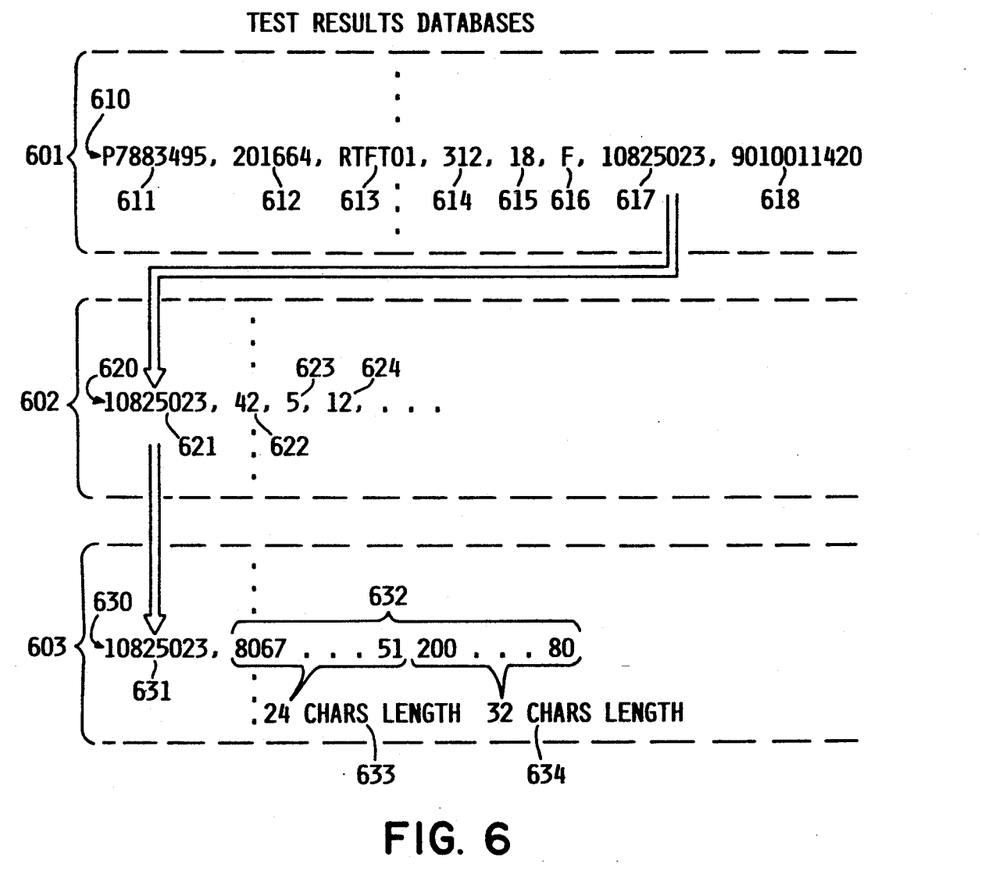
FIG. 6 shows the structure of the test result databases in the preferred embodiment.

Test results databases 312 comprise three separate database files containing failure symptom information, as shown in FIG. 6. Card process result file 601 contains an entry for each test performed on each individual card, identifying the test, the test station, the individual card, and the result (pass/fail). If the result of the test was failure, additional information is contained in two more files. Environmental data table 602 contains environmental information concerning test conditions. Extended failure information log 603 contains the actual failure symptoms.

FIG. 6 shows typical entries in test result databases 312. Card process result file entry 610 comprises card part number 611, card serial number 612, test station identifier 613, test operator identifier 614, machine group of test station 615, test result 616, transaction identifier 617, and time/date stamp 618. Test result field 616 contains either "P" (pass), "F" (fail) or "R" (passed on retry). Transaction identifier 617 is an arbitrary unique identifier for the test entry. Environmental data table entry 620 contains transaction identifier 621 and a plurality of fields specifying test conditions 622–624, e.g. test temperature, applied voltages, identification of test fixture, etc. Extended failure information log entry 630 contains transaction identifier 631 and error code 632. Transaction identifier 617 of card process result file entry 610 is used as a key to access the corresponding environmental data table entry 620 and extended failure information log entry 630 when test result field 616 is 'Fail', as shown by the arrow in FIG. 6. Where the test result is 'Pass', no corresponding entries are made in environmental data file 602 and extended failure information log 603. Error code 632 comprises 24-character major part 633 and 32-character minor part 634. Major part 633 identifies the basic failure symptoms, while minor part 634 identifies the conditions of the registers read from test pins. Minor part 634 provides a more specific level of diagnosis, but is not always necessary. E.g., for certain diagnoses, the condition of the registers is undefined, and the minor part is probably not meaningful. Where two cards exhibit the same major and minor part error codes, it is highly probable that the error is caused by the same defect. Where two cards exhibit the same major part error code, but different minor part error codes, there is generally a reduced probability that the error is caused by the same defect.

Figure 7:
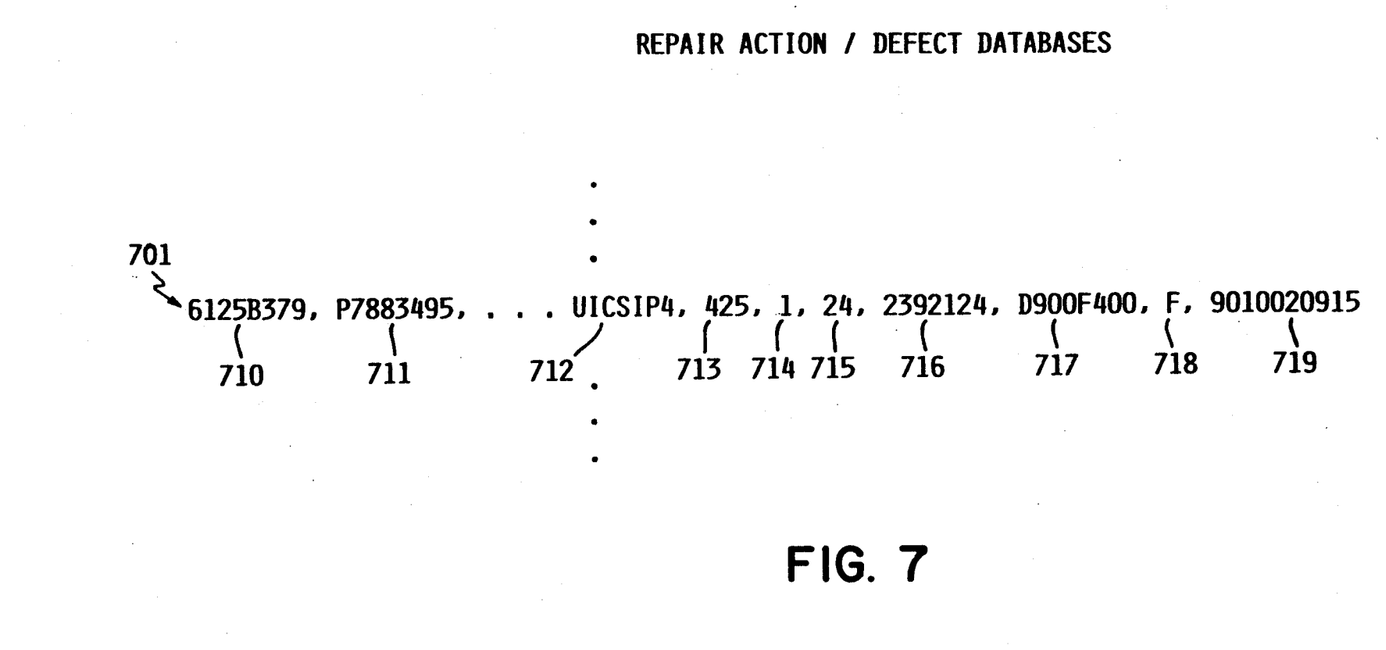
FIG. 7 shows the structure of the repair action/defect databases in the preferred embodiment.

Repair action/defect databases 313 comprise two database files, a repair action file and a defect file. Entries in both files have identical fields. The repair action file contains an entry for each repair action taken by a test station. If subsequent testing of the card assembly establishes that the repair action corrected the defect, the entry in the repair action file is copied to the defect file. Thus, the defect file is a subset of the repair action file, containing only those diagnoses/repair actions shown to be correct. The format of an entry in either file is shown in FIG. 7. Each entry 701 comprises transaction identifier 710, card assembly part number 711, rework station identifier 712, rework station operator 713, defect quantity 714, defect code 715, part number of defective component 716, defect location on card 717, side of card on which defect occurred 718, and time/date stamp 719. Defect quantity field 714 tracks the number of occurrences of a defect, which is usually one; in some cases, (e.g., "bent pin", "defective solder joint"), the defect may occur more than once with respect to a single component.

Figure 8:
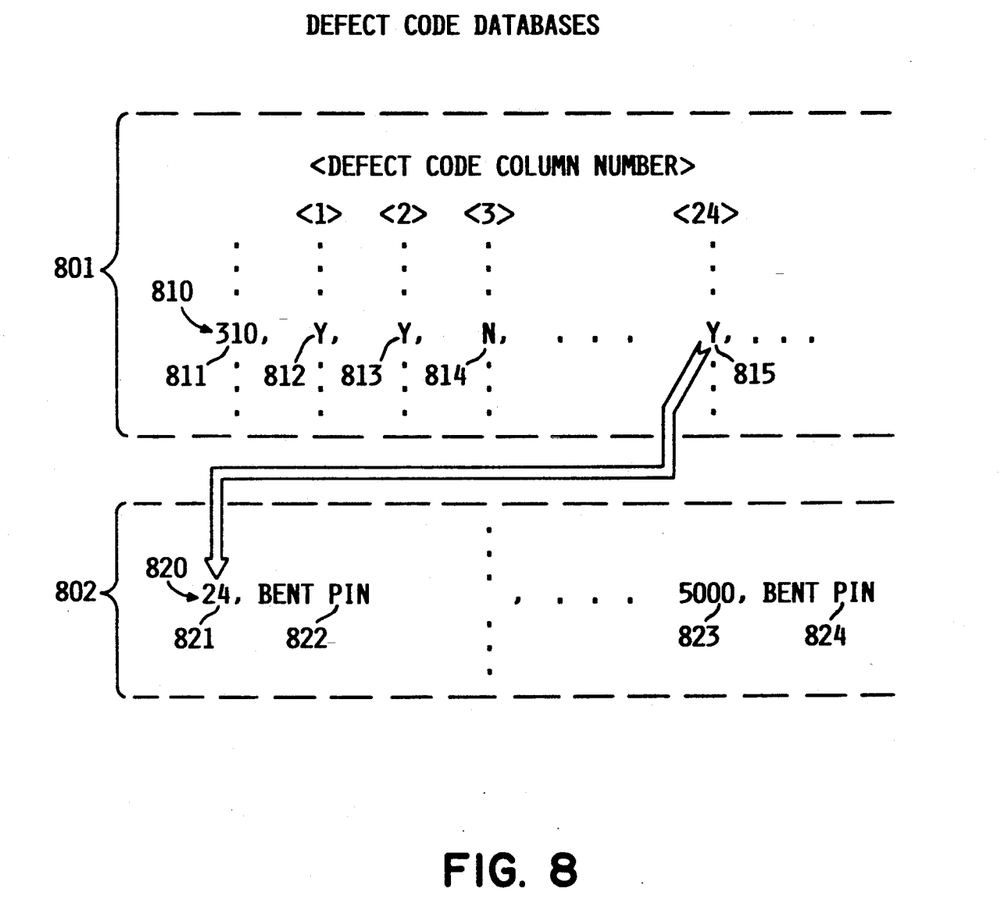
FIG. 8 shows the structure of the defect code databases in the preferred embodiment.

Defect code databases contain information relating each sub-object type to the possible defects that may be experienced with respect to the component. It comprises two files, sub-object type cross reference table 801 and defect code table 802, as shown in FIG. 8. Sub-object type cross-reference table relates each sub-object type to the possible defect codes associated with a sub-object of that type. Each entry 810 contains sub-object type identifier 811, and a plurality of flag fields 812-815 indicating whether the defect code associated with the field column applies to the sub-object type. Defect code table 802 contains more detailed information regarding each defect code. Each entry 820 is keyed by defect code number, and comprises defect code 821, text description 822, target defect rate 823, and text description for menu selection use by the repair cell 824. For example, in FIG. 8, flag field no. 24 contains "Y", indicating that defect code 24 is a valid defect code for sub-object type 310. The meaning of defect code 24 is explained in the keyed entry 820 in defect code table 802.

Repair cell 300 makes use of two distinct expert diagnostic functions. The first level, which does not use diagnostic knowledge base 320, is a non-inferencing statistical analysis of past failures and subsequently successful repair actions. In the case of relatively common failures, this level of diagnosis often covers a sufficient number of instances to yield good diagnostic resolution and high 'hit' rates. While this type of analysis is very fast, it is limited to defects which have occurred in the past, preferably more than once. This system may make either a single diagnosis or several diagnoses for the same error condition. In cases where multiple diagnoses are produced, a statistical likelihood is included with each one.

The second level of diagnosis is directed search of recommended analysis procedures, using rules contained in diagnostic knowledge base 320. This set of rules is established cooperatively by the design engineer and a knowledgeable test engineer. This set of rules can be accessed by repair cell 300 for use by expert system inference engine 304. In the preferred embodiment, inference engine 304 is an IBM Knowledge Director expert system inference engine, although other inference engines could be used. The operator can invoke a consultation mode at will, calling inference engine 304 to recommend actions based on the rules in knowledge base 320 when the operator needs guidance. In both consultation modes, the actual consultation session runs on local computer 114.

Figure 9:
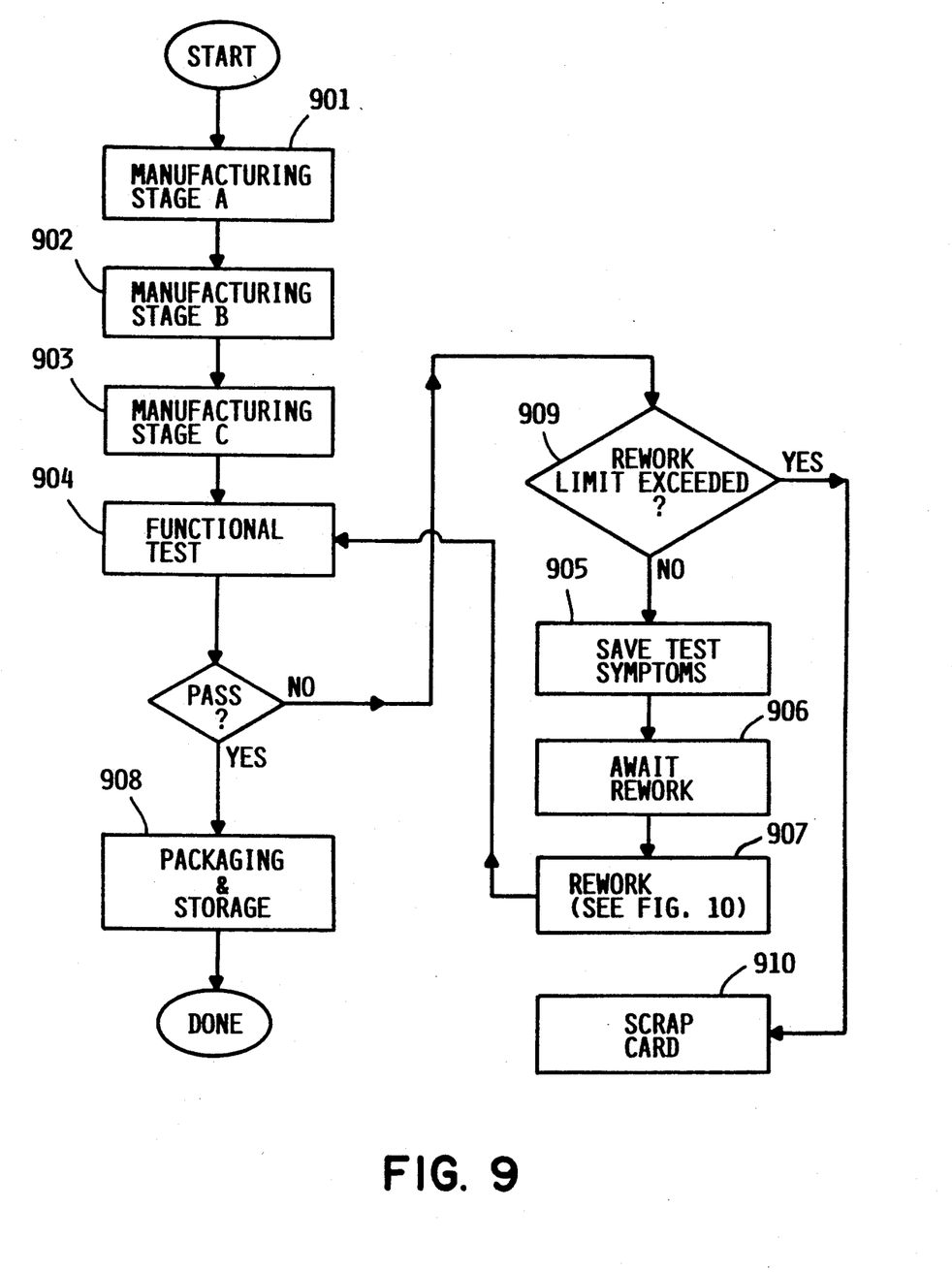
FIG. 9 is a block diagram of the major steps in the manufacturing environment according to the preferred embodiment.
Figure 10:
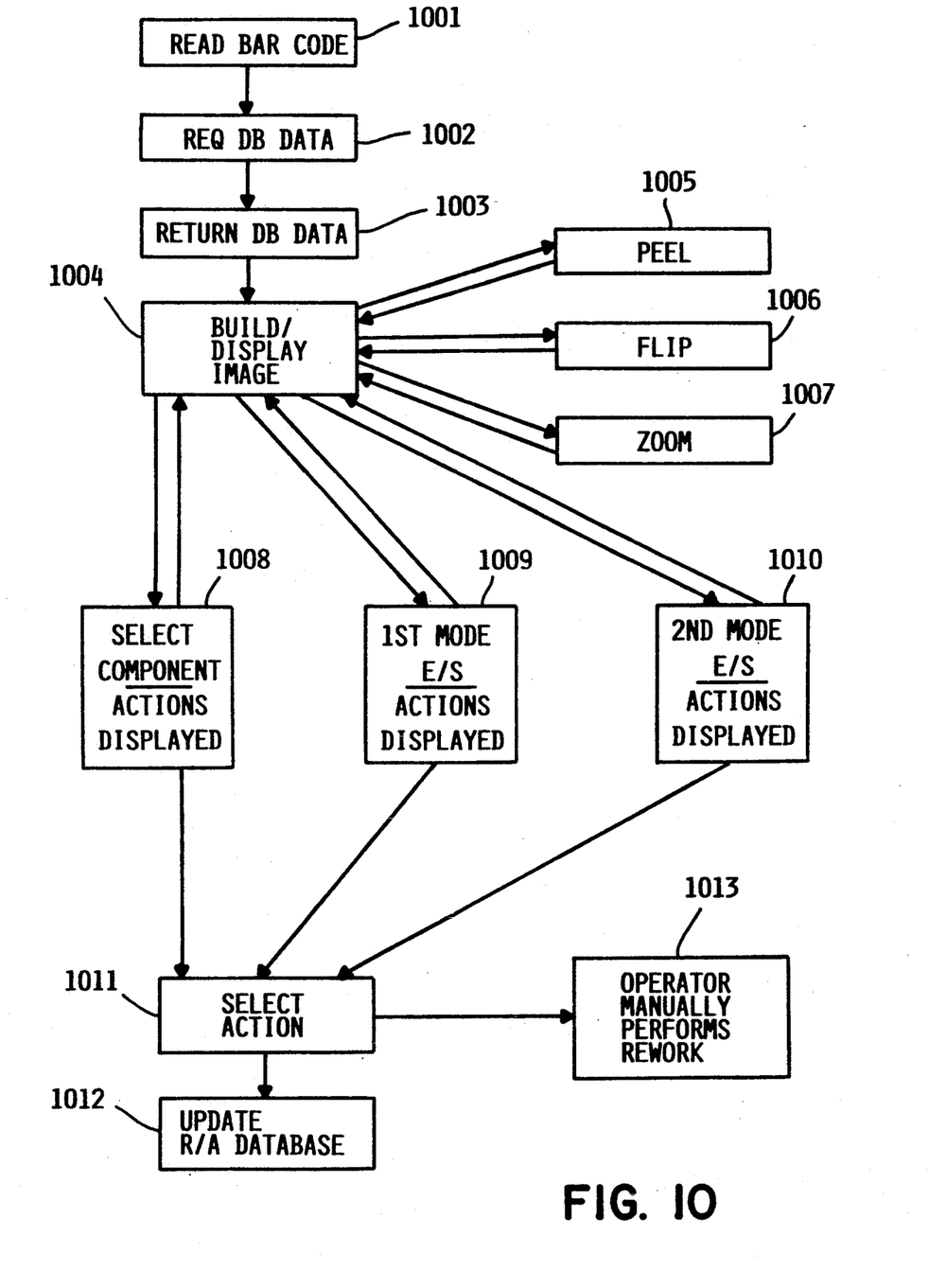
FIG. 10 is a flowchart of the operation of a typical rework station according to the preferred embodiment.

The operation of the rework station according to the preferred embodiment is now described. FIG. 9 shows a block diagram of the major steps of the manufacturing environment in which the rework station operates. A block diagram of the major steps of operation of the rework station itself is shown in FIG. 10. In this environment, each card assembly passes through one or more stages of manufacture 901, 902, 903, and at the conclusion thereof is subjected to a functional test 904. If the test reveals any failure symptoms, the test results are saved in a database 905 and the card is sent to a queue to await rework 906. When a rework station becomes available, the rework station diagnoses and repairs the problem 907, and returns the card to functional test 904. If the card passes functional test, it proceeds to a packaging area 908, where it is packed and stored in inventory. In order to avoid infinite looping of an individual card between testing 904 and rework 907, a limit is placed on the number of times an individual card may be reworked. Therefore, immediately after testing, this limit is checked 909. If the limit is exceeded, the card is scrapped 910; otherwise it proceeds to save test results 905, await rework 906, and rework 907, as described above. Although three manufacturing stages following by a single test stage are shown, it should be understood that the number and placement of stages of each type is variable.

Operation of the rework station is shown in FIG. 10. Operation begins when a card 101 which exhibited symptoms of failure arrives. The rework station operator first reads bar-code label 102 on the card with bar-code reader 113, at step 1001. The bar-code label tells repair cell 300 the serial number and part number of card assembly 101. In the preferred embodiment, the manufacturing facility may be simultaneously engaged in the manufacture of cards having different part numbers, but the rework station is generic, i.e., capable of repairing any type card. It is therefore necessary to identify the type of card being repaired to repair cell 300.

Repair cell 300 responds to part and serial number identification by requesting data over LAN 200 from resource/database server 220, at step 1002. Repair cell 300 will request the test results and history of repair actions for the individual card under rework. Repair cell 300 may also request the card component file 400 and associated bitmaps for the part number of the card under rework, depending on whether or not these are already in storage on local computer 114. Resource/- database server 220 responds at step 1003 by supplying the requested information. Server 220 will query test results databases 312 and repair action/defect databases 313 for all actions affecting the card under rework, and build a log for that card only, which is returned to repair cell 300.

When card component file 400 and the bitmap images are available on local computer 114, graphical image procedure 301 constructs an image of the card for display to the operator at step 1004. Graphical image procedure 301 processes the list of sub-objects in card component file 400 line by line, copying the specified bitmap image, in the orientation specified, to the area described by the entries in sub-object extent fields 421–424. As each bitmap is copied, it may overlay all or a portion of a previous bitmap. Thus, an important additional parameter is hidden in the card component file; it is expressed by the sort order in which the sub-object descriptions appear. Components hidden under other components appear first in the list, and are subsequently covered by the bitmap images corresponding to components later in the list, just as the physical component would by covered. For example, in the case of a card assembly, a component such as a socket or decoupling capacitor may be covered by another component. This ability to overlay components from the list ordering supports the capability to remove components from the graphical image and reveal those that lie underneath.

If the operator wishes to work with a hidden component, he may select a component for removal from the displayed image, to reveal those lying underneath at step 1005. The operator selects a "peel off" function from a menu, and repair cell 300 responds by modifying the image. The selection of the component is made by pointing to the location of the component's image on the screen with lightpen 113 or other cursor pointing device. In response to this selection, select decode procedure 302 determines the screen coordinates of the selected location, and maps this coordinate location to the component which contains the location within its rectangular extent area 503. If more than one component extent area includes the location, the most visible component (last active component on the list) is selected. Select decode procedure 302 returns the identity of the selected sub-object. The image is modified by reconstructing that portion of it within the rectangular extent area 503 of the component being "peeled off". Since the entries in card component file 400 are ordered by physical level, it is only necessary to reconstruct the extent area using sub-object entries occurring before the selected sub-object in the list.

Related to the "peel off" function is a flip function, by which the operator can elect to flip the card image to its reverse side at step 1006. In many card assemblies, components are attached to both sides of the card, making it necessary to enable depiction and selection of components on either side. The operator may also select a "zoom" function at step 1007, to enlarge crowded areas of the card assembly for easier viewing and selection of small components. In the case of either peel off, flip or zoom function, repair cell 300 returns to the main display menu after modifying the image as requested.

From the main display menu, the operator has several choices available. The operator may be able to diagnose the problem immediately by simple visual inspection or other means. The operator may also invoke either of two expert system consultation modes to assist in diagnosing the problem.

If the operator can diagnose the problem without on-line assistance from the expert system, he may immediately select a component to work with at step 1008. The selection is made by pointing to the component with light pen 113 in the same manner as selecting a component to peel off. Select decode procedure 302 determines the selected component, and returns the identity of the selected sub-object. The sub-object entry identifies the type of sub-object. Each type of sub-object is associated with a list of possible diagnoses/repair actions. Repair cell 300 displays a menu of such diagnoses/repair actions applicable to the selected component. The operator then selects one of these actions with light pen 113.

The operator may select either of two expert consultation modes. The first mode invokes a non-inferencing statistical analysis of past failures and subsequently successful repair actions at step 1009. Repair cell 300 queries test results databases 312 for all instances of the same or similar test symptoms, i.e. having same or similar error code 633. It then queries the defect file of repair action/defect databases 313 to determine which repair action was subsequently successful in resolving the defect. Finally, it queries the repair action file of repair action/defect databases 313 to determine which repair actions have previously been performed on the individual card assembly under rework. Any repair actions already attempted on the card are rejected, and not presented to the operator. The remaining diagnoses/repair actions are presented to the operator, along with the number of instances found. Two separate lists of diagnoses/repair actions are presented, one in which both major part 633 and minor part 634 of error code 632 matched, and the other in which only major part 633 matched, with separate number of instances presented in each case. These lists are sorted in descending order of number of instances found. Generally, it will be expected that the operator will prefer diagnoses from the more specific list (containing matches for both parts), but in the event that list contains no entries or its entries have a very small number of instances, the operator may elect a diagnosis from the less specific list.

The second expert consultation mode at step 1010 is a directed search of recommended analysis procedures. In cases where the failure syndrome has not previously been seen, or only occurs rarely, a history driven knowledge base used in the first consultation mode is of little assistance. It is in this situation that the second mode of knowledge base operation is most useful. This system is based upon a multi-way branching tree algorithm; a consultation session consists of asking the user increasingly specific 'questions', and using this information to branch to the next lower level of detail. In this embodiment, repair cell 300 highlights the component or components under scrutiny. By selecting any one component, repair cell 300 displays 'questions' in the form of possible defects or actions required. The operator then verifies whether the defect exists or performs the action. In an additional embodiment, the repair cell application may be connected to a test fixture. These 'questions' may in some cases be routed directly to the tester for resolution. An example would be a situation where the consultation session requires the application of additional test cases to make a proper determination of condition. In these cases, the repair cell issues the commands directly to the tester, allowing large portions of the consultation session to run 'hands off'. The operator is only called upon when physical action is required (e.g. 'Replace Component') or when knowledge outside the domain of the system is required (e.g. "Has Adjustment 'A' been performed on this unit?").

The decision tree used by this system is developed cooperatively by the device designers and test engineers. The input knowledge for this process is a combination of the following factors. A fault tree analysis indicates how the device is likely to fail, based upon how it is designed and manufactured. The point of failure within the test sequence indicates what areas of device function have been proven operational up to that point, what areas are yet to be proven, and what area of function was this portion of the test designed to validate; it may also take into account prior repair actions to the card under rework. The historical analysis of previous similar designs indicates what areas can be expected to cause trouble, how have they failed in past designs, and what repair actions have been effective. Manufacturing process analysis indicates what fault types are likely to be contributed by the manufacturing processes and what failure syndromes they would generate. Since this decision tree is based in part on past history, it is expected that as the system gathers defect code statistics, the rules will be updated to reflect new knowledge.

When the operator has determined an appropriate diagnosis/repair action, either by his own inspection or in consultation with the system, he selects the action from among the alternatives displayed with light pen 113 at step 1011. This selection automatically causes an entry to be made in the repair action file of repair action/defect database 313 at step 1012. No other action on the operator's part is required to create the database entry. The operator then performs the indicated repair action at step 1013.

After the repair action is performed, the card assembly is again tested. This test may be performed at the rework station, or at a separate testing station. If the card now passes the test, the entry previously made in the repair action file is copied to the defect file of repair action/defect database 313. The card is then returned to the normal manufacturing stream.

Messages to update the repair action/defect database are sent by the rework station or test station to resource/database server 220, which writes new information to storage. At the same time, defect monitor 224 monitors the frequency of confirmed defects. This monitor analyzes each new entry in the defect file of repair action/defect database 313 when it is added to the database. Based upon the stored target defect rate field 823 of defect code table 802, a determination is made on a per event basis whether this observation is an indication that the process is going (or has already gone) outside its control limits. If a process control problem is detected, defect monitor 224 sends a warning message to plant manager 216. Additionally, the appropriate process engineer is electronically notified. In cases where the deviation represents a quality exposure or safety hazard, the defect monitor may also notify the process equipment to halt. This latter ability is contingent upon the process equipment being designed to accept and react to such a message. A report generating program may also upon request retrieve data from repair action/defect database to generate reports of defect rates for the plant or specific components, processes or work stations.

By making the repair cell the interface to the diagnostic mechanism, the operator is no longer burdened with a separate data collection mechanism, and need not even be aware that his actions are gathering data. This can be a productivity gain as well as an aid to the completeness and accuracy of the collected data. The integration of a knowledge base interface perceptually provides the operator with a single tool, encompassing the testing, diagnosis, and repair of entities, with a 'built in' expert to provide guidance. The primarily graphical nature of the interchange between the operator and the system also aids the marginally fluent user by minimizing textual exchanges.

Because the system is driven by selection of subobjects and menu items, there is no confusion over what actions to 'tell' an entity to perform; each object informs the user of its capabilities upon its selection. This reversal of 'verb/object' commands to 'object/verb' selections largely eliminates the existence of messages of the form 'The object cannot perform the requested action'. Indeed, since the sub-object provides the user with a selection of actions which it is capable of performing, the user cannot select an action that is not offered. This also helps overcome any potential 'jargon barrier', where various objects might name the same action differently (e.g. 'Replace','Repair','Substitute', and 'New Part').

Since the characteristics of the sub-objects is contained within each entry, new systems can be 'grown' by inheriting some or many of the sub-object types from one or many other systems. The visual representation (bitmap) of the sub-object has intentionally been divorced from its 'Type'. Thus, one sub-object type can be represented by different bitmaps in different instances of the sub-object. For example, a sub-object of type 'Screw' can support images of many different sizes and shapes of 'Screw', so long as their capabilities and properties match. Conversely, a single bitmap may be used by sub-objects of different type. For example, the same component may have different failure modes, depending on the process used to attach the component to the card. In such a case, there will be different sub-object types for the component, depending on the process used. However, the component will still look the same, so its bitmap image will be the same in either case. As a result, the number of sub-object types and bitmaps which must be produced is greatly reduced. This also reduces the burden of creating new instances of existing sub-object types.

In the preferred embodiment, repair cell 300 is but a part of a comprehensive computer integrated manufacturing system. In addition to supporting repair cell 300, this comprehensive system supports manufacturing stations, test stations, plant monitoring, etc. Applications running on these stations could include more traditional CIM applications, such as material requirements planning and work station scheduling. It can also serve as a platform for an integrated set of general use operator tools, such as notebook, calendar, timecard and labor tracking, electronic mail, etc. The individual work stations are coupled by local area network 200 to resource/database server functions, which are available to all work stations. This supports a cooperative processing paradigm, with the majority of applications actually running at the work station level. A distinct advantage to this arrangement is the reduced loading on the servers, since additional work stations bring with them additional processing power. However, in a alternative embodiment, a repair cell in accordance with this invention could operate without being attached to a comprehensive CIM system. For example, a rework station and test station could be one and the same, driven by a single local computer which stores databases required by the repair cell application. The rework station might alternatively be connected to a local area network of similar stations and a database server, without any connection to manufacturing stations.

In the preferred embodiment, the various work stations are coupled together via a local area network, permitting distributed processing. In an alternative embodiment, the work stations could be simple non-programmable terminals, connected to a central mainframe computer which controls access to the database and supports multiple users simultaneously.

In the preferred embodiment, the primary means of interaction with the repair cell is via a cursor pointing device such as a light pen. Generally, the operator is not required to use a keyboard or other textual input device. This not only speeds and simplifies user interaction, but improves the accuracy of the passively collected data. This feature is enhanced through the ancillary application of a bar code scanner. However, it should be understood that the cursor pointing device is not essential to the operation of the repair cell, and in an alternative embodiment the operator could enter all data via a keyboard.

In the preferred embodiment, the representation of card assembly 101 on display 110 is a graphical image, which resembles the card in visual appearance. In an alternative embodiment, any representation which would allow the operator to identify and select components could be used. For example, non-graphics characters could be used as component labels in approximately the same location as the components themselves, the components being selected by pointing to the labels. A representation could even be as simple as a list of components.

In the preferred embodiment described above, the article being reworked is an electronic circuit card assembly. Such assemblies lend themselves to two-dimensional graphical representation on a computer display. Since circuit cards may have components on both sides, a "flip" function is necessary to represent components on the opposite side. Beyond this "flip" function, there is no need for more complex three-dimensional representation. Many other articles of manufacture can be represented in two-dimensions as described above. It is not necessary that the article itself have no depth, but only that a two-dimensional representation can be constructed which is sufficiently recognizable for an operator to be able to identify components by pointing to them on the screen. However, in an alternative embodiment, this invention could be applied to more complex representations in three or more dimensions. For example, in addition to the four extent fields 421-424, two additional fields could be provided for depth, additional bitmaps could be provided for rotating the image, etc. In the alternative, the article could be represented as a series of vectors, enabling rotating the image about an arbitrary axis.

Although a specific embodiment of the invention has been disclosed along with certain alternatives, it will be recognized by those skilled in the art that additional variations in form and detail may be made within the scope of the following claims.

What is claimed is:

1. A computer integrated manufacturing apparatus for supporting rework of a manufactured article, said article comprising a plurality of components, said apparatus comprising:

means for storing and retrieving with a computer unique component descriptive information for each of said plurality of components, said unique component descriptive information identifying a list of possible defect diagnoses associated with said component;

means for displaying a representation of said manufactured article on a display coupled to said computer, wherein said representation comprises a graphical image which resembles the article in visual appearance;

means, interactive with said display means, for selecting a component of said manufactured article; and means, responsive to said means for selecting a component, for displaying, on said display coupled to said computer, said list of possible defect diagnoses associated with said selected component.

2. The computer integrated manufacturing apparatus of claim 1, further comprising means, responsive to said means for selecting a component, for removing said component from the displayed image representation of said manufactured article, and substituting therefor an image of components that would be visible beneath the selected component if said selected component were physically removed from the article.

3. The computer integrated manufacturing apparatus of claim 1, further comprising expert system consultation means for invoking an expert system to recommend one of said possible defect diagnoses.

4. The computer integrated manufacturing apparatus of claim 3, wherein said expert system consultation means comprises:

a knowledge base of expert system production rules; and an inference engine for applying input data to said knowledge base to draw inferences.

5. The computer integrated manufacturing apparatus of claim 1, wherein said unique component descriptive information comprises information for constructing a graphical representation of said component; and wherein said means for displaying a representation of said manufactured article comprises means for constructing an image of said article from said information for constructing a graphical representation of each component of said article.

6. The computer integrated manufacturing apparatus of claim 5, further comprising means, responsive to said means for selecting a component, for removing said component from the displayed image representation of said manufactured article, and substituting therefor an image of components that would be visible beneath the selected component if said selected component were physically removed from the article.

7. The computer integrated manufacturing apparatus of claim 5, further comprising expert system consultation means for invoking an expert system to recommend one of said possible defect diagnoses.

8. The computer integrated manufacturing apparatus of claim 7, wherein said expert system consultation means comprises:

a knowledge base of expert system production rules; and an inference engine for applying input data to said knowledge base to draw inferences.

9. The computer integrated manufacturing apparatus of claim 1, wherein said display means further displays, with respect to each of a plurality of said possible defect diagnoses, a representation of the probability that said possible defect diagnosis is correct.

10. The computer integrated manufacturing apparatus of claim 9, further comprising:
means for storing and retrieving, for each of said possible defect diagnoses, a quantity representing the frequency of occurrence of said possible defect diagnosis; and
means for calculating said representation of the probability that said possible defect diagnosis is correct, wherein said probability is calculated from said quantity representing the frequency of occurrence of said possible defect diagnosis.

11. The computer integrated manufacturing apparatus of claim 10, further comprising:
means, interactive with said display means, for selecting one of said possible defect diagnosis for execution of a corresponding repair action;
repair action result feedback means for identifying whether said repair action, when executed, corrected said set of failure symptoms; and
defect tracking means, responsive to said repair action result feedback means, for incrementing said quantity representing the frequency of occurrence of said defect diagnosis if said repair action, when executed, corrected said set of failure symptoms.

12. The computer integrated manufacturing apparatus of claim 11, further comprising:
defect rate monitoring means, responsive to said defect tracking means, for determining when said quantity representing the frequency of occurrence of said defect diagnosis is incremented beyond a predetermined level; and
remedial action means, responsive to said defect rate monitoring means, for automatically taking remedial action when said defect rate monitoring means determines that said quantity exceeds said predetermined level.

13. The computer integrated manufacturing apparatus of claim 9, further comprising:
frequency set determination means for determining, for each of said sets of failure symptoms which may occur with respect to said manufactured article, a set of quantities representing the frequency of occurrence of a set of possible defect diagnoses when the set of failure symptoms is present; and
means for deriving said representation of the probability that said possible defect diagnosis is correct, wherein said representation is derived from the quantity in said set of quantities representing the frequency of occurrence of said possible defect diagnosis.

14. The computer integrated manufacturing apparatus of claim 13, wherein said frequency set determination means comprises:
means for storing a plurality of sets of failure symptoms generated by testing individual manufactured articles;
means for storing, for each of said set of failure symptoms, a defect diagnosis associated with a repair action which subsequently corrected said set of failure symptoms; and
means for deriving said set of quantities representing the frequencies of occurrence of a set of possible defect diagnoses from said stored sets of failure symptoms and defect diagnoses associated with repair actions which subsequently corrected the failure symptoms.

15. The computer integrated manufacturing apparatus of claim 14, further comprising:
means, interactive with said display means, for selecting one of said possible defect diagnosis for execution of a corresponding repair action;
repair action result feedback means for identifying whether said repair action, when executed, corrected said set of failure symptoms; and
defect tracking means, responsive to said repair action result feedback means, for automatically storing said defect diagnosis in a database of defect diagnoses determined to have been correct.

16. The computer integrated manufacturing apparatus of claim 1, wherein each individual manufactured article has a unique identifier, and said apparatus further comprises means for uniquely identifying a manufactured article.

17. The computer integrated manufacturing apparatus of claim 16, wherein said unique identifier is a series of characters printed on a bar-code label, and said means for uniquely identifying a manufactured article comprises a bar code reader input device.

18. The computer integrated manufacturing apparatus of claim 16, wherein said failure identification means comprises:
failure symptom input means for inputting said set of failure symptoms and said unique identifier from a testing station;
means, coupled to said failure symptom input means, for storing said set of failure symptoms with said unique identifier; and
means, responsive to said means for uniquely identifying an article, for retrieving said set of failure symptoms.

19. The computer integrated manufacturing apparatus of claim 18, wherein said display means is located at a rework station remote from said testing station.

20. A method of using a computer coupled to a computer display to support rework of a manufactured article, comprising the steps of:
storing one or more set of failure symptoms which may occur with respect to said manufactured article;
storing one or more sets of possible defect diagnoses of said manufactured article, wherein each of said sets of failure symptoms is associated with one of said sets of possible defect diagnoses and wherein each of said sets of possible defect diagnoses is associated with at least one component of said manufactured article;
displaying a representation of said manufactured article on a display coupled to said computer, said representation comprising a graphical image which resembles the article in visual appearance;
interactively selecting from said representation on said display a component of said manufactured article;
identifying a set of failure symptoms associated with an individual manufactured article;
retrieving the set of possible defect diagnoses associated with said set of failure symptoms associated with said individual manufactured article and with said component selected by said interactively selecting step; and displaying on said display said set of possible defect diagnoses associated with said set of failure symptoms associated with the individual manufactured article.

21. The method of claim 20, further comprising the steps of:
  determining, with respect to each defect diagnosis in said set of possible defect diagnoses displayed on said display, a representation of the probability that said defect diagnosis is correct; and
  displaying on said display each of said representations of the probability that a defect diagnosis is correct.

22. The method of claim 21, wherein said step of determining, with respect to each defect diagnosis, a representation of the probability that said defect diagnosis is correct, comprises the steps of:
  storing, for each of said possible defect diagnoses, a quantity representing the frequency of occurrence of said possible defect diagnosis; and
  deriving said representation of the probability that said possible defect diagnosis is correct from said quantity representing the frequency of occurrence of said possible defect diagnosis.

23. The method of claim 22, further comprising the steps of:
  selecting one of said possible defect diagnosis for execution of a corresponding repair action;
  executing said repair action;
  identifying whether said repair action, when executed, corrected said set of failure symptoms; and
  incrementing said quantity representing the frequency of occurrence of said defect diagnosis if said repair action, when executed, corrected said set of failure symptoms.

24. The method of claim 23, further comprising the steps of:
  determining when said quantity representing the frequency of occurrence of said defect diagnosis is incremented beyond a predetermined level; and
  automatically taking remedial action in response thereto.

25. The method of claim 21, further comprising the steps of:
  determining, for each of said sets of failure symptoms which may occur with respect to said manufactured article, a set of quantities representing the frequency of occurrence of a set of possible defect diagnoses when the set of failure symptoms is present; and
  deriving said representation of the probability that said possible defect diagnosis is correct, wherein said representation is derived from the quantity in said set of quantities representing the frequency of occurrence of said possible defect diagnosis.

26. The method of claim 25, wherein said step of determining a set of quantities representing the frequency of occurrence of a set of possible defect diagnoses comprises the steps of:
  storing a plurality of sets of failure symptoms generated by testing individual manufactured articles;
  storing, for each of said set of failure symptoms, a defect diagnosis associated with a repair action which subsequently corrected said set of failure symptoms; and
  deriving said set of quantities representing the frequencies of occurrence of a set of possible defect diagnoses from said stored sets of failure symptoms and defect diagnoses associated with repair actions which subsequently corrected the failure symptoms.

27. The method of claim 26, further comprising the steps of:
  selecting one of said possible defect diagnosis for execution of a corresponding repair action;
  identifying whether said repair action, when executed, corrected said set of failure symptoms; and
  automatically storing said defect diagnosis in a database of defect diagnoses determined to have been correct, if said repair action was determined to have been correct.

28. The method of claim 20, wherein each manufactured article contains a unique identifier, and said method further comprises the step of uniquely identifying said individual manufactured article to said computer.

29. The method of claim 28, wherein said step of uniquely identifying said individual manufactured article to said computer comprises reading a unique identifier contained on a bar-code label on the card with a bar-code reader input device.

30. The method of claim 28, wherein said step of identifying a set of failure symptoms comprises the steps of:
  inputting said set of failure symptoms and said unique identifier from a testing station;
  storing said set of failure symptoms with said unique identifier; and
  retrieving said set of failure symptoms in response to said step of uniquely identifying said individual manufactured article.

31. The method of claim 30, wherein said step of uniquely identifying said individual manufactured article to said computer comprises reading a unique identifier contained on a bar-code label on the card with a bar-code reader input device.

* * * * *